US012767868B2

(12) United States Patent
Kageyama et al.

(10) Patent No.: US 12,767,868 B2
(45) Date of Patent: Oct. 20, 2026

(54) TWO-PACK TYPE CURABLE ADHESIVE COMPOSITION

(71) Applicant: THE YOKOHAMA RUBBER CO., LTD., Hiratsuka (JP)

(72) Inventors: Hirokazu Kageyama, Hiratsuka (JP); Kazushi Kimura, Hiratsuka (JP); Yutaro Yamamoto, Hiratsuka (JP)

(73) Assignee: The Yokohama Rubber Co., Ltd., Kanagawa (JP)

( * ) Notice: Subject to any disclaimer, the term of this patent is extended or adjusted under 35 U.S.C. 154(b) by 460 days.

(21) Appl. No.: 18/580,693

(22) PCT Filed: Jul. 12, 2022

(86) PCT No.: PCT/JP2022/027372

§ 371 (c)(1),
(2) Date: Jan. 19, 2024

(87) PCT Pub. No.: WO2023/008175

PCT Pub. Date: Feb. 2, 2023

(65) Prior Publication Data

US 2025/0084289 A1 Mar. 13, 2025

(30) Foreign Application Priority Data

Jul. 26, 2021 (JP) ................................ 2021-121603

(51) Int. Cl.

| | |
|---|---|
| ***C09J 175/08*** | (2006.01) |
| ***C08G 18/08*** | (2006.01) |
| ***C08G 18/10*** | (2006.01) |
| ***C08G 18/32*** | (2006.01) |
| ***C08G 18/44*** | (2006.01) |
| ***C08G 18/48*** | (2006.01) |

(Continued)

(52) U.S. Cl.
CPC ........ *C09J 175/08* (2013.01); *C08G 18/0838* (2013.01); *C08G 18/10* (2013.01); *C08G 18/4833* (2013.01); *C09J 5/00* (2013.01)

(58) Field of Classification Search
None
See application file for complete search history.

(56) References Cited

U.S. PATENT DOCUMENTS

2017/0260434 A1* 9/2017 Matsuki ............... C08G 18/792

FOREIGN PATENT DOCUMENTS

JP 2017-082118 A 5/2017

* cited by examiner

*Primary Examiner* — Ha S Nguyen
(74) *Attorney, Agent, or Firm* — Carrier, Shende & Associates P.C.; Joseph P. Carrier; Fulchand P. Shende

(57) ABSTRACT

A two-pack type curable adhesive composition includes a base containing a urethane prepolymer having an isocyanate group, and a curing agent. At least one of the base and the curing agent contains polymer particulates having an average particle size of from 0.01 to 200 μm, the polymer particulates having a glass transition temperature of from −40° C. to +80° C., a content of the polymer particulates is ≥5 mass % in a total amount of the adhesive composition. A cured product of the adhesive composition has a loss tangent of ≥0.15 under a temperature region of from −40° C. to +80° C. and a frequency of 100 Hz, and the cured product not breaking under a stress amplitude of 2.8 MPa and a repetition number of up to $10^7$ times in a tensile shear fatigue property test JIS K6864.

18 Claims, 1 Drawing Sheet

(51) Int. Cl.

| | |
|---|---|
| ***C08G 18/76*** | (2006.01) |
| ***C09J 5/00*** | (2006.01) |
| ***C09J 175/04*** | (2006.01) |
| ***C09J 175/06*** | (2006.01) |

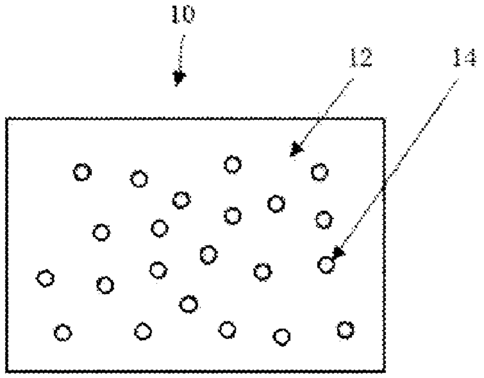
10
12
14

TWO-PACK TYPE CURABLE ADHESIVE COMPOSITION

TECHNICAL FIELD

The present invention relates to a two-pack type curable adhesive composition.

BACKGROUND ART

For the purpose of providing a two-pack type urethane-based adhesive composition that maintains an excellent curing rate as two liquids and has good adhesiveness and heat resistance, in the related art, there has been disclosed a two-pack type urethane-based adhesive composition including a base containing a urethane prepolymer (A) having an isocyanate group and a curing agent containing a compound (B) having two or more active hydrogen-containing groups per molecule, where at least one of the base or the curing agent contains a compound (C) having an isocyanurate ring and particulates (D) containing an organic substance and having an average particle size of from 0.1 to 10 μm (Patent Document 1).

CITATION LIST

Patent Document

Patent Document 1: JP 2017-82118 A

SUMMARY OF INVENTION

Technical Problem

In recent years, adhesives have been required to have improved fatigue durability and damping performance at the same time from the viewpoint of prolonging the service life and suppressing vibration and the like.

In such circumstances, the present inventors prepared a two-pack type adhesive composition with reference to the patent document described above and evaluated the composition, and have found that it is difficult to improve fatigue durability and damping performance of such a composition at the same time. This is because there is a trade-off relationship between fatigue durability and damping performance.

An object of the present invention is to provide a two-pack type curable adhesive composition that can provide high fatigue durability and high damping performance in a compatible manner.

Solution to Problem

As a result of intensive studies to solve the above problems, the present inventors have found that a desired effect can be obtained when at least one of a base containing a urethane prepolymer having an isocyanate group or a curing agent contains specific polymer particulates, and have completed the present invention.

An embodiment of the present invention is based on the findings described above, and specifically solves the problems described above by the following configurations.

[1]

A two-pack type curable adhesive composition including:

a base (A) containing a urethane prepolymer (a1) having an isocyanate group; and a curing agent (B), at least one of the base (A) or the curing agent (B) containing polymer particulates (X) having an average particle size of from 0.01 to 200 μm, the polymer particulates (X) having a glass transition temperature of from −40° C. to +80° C., a content of the polymer particulates (X) being 5 mass % or greater in a total amount of the two-pack type curable adhesive composition, a cured product (P) obtained by curing the two-pack type curable adhesive composition having a loss tangent of 0.15 or greater under conditions of a temperature region of from −40° C. to +80° C. and a frequency of 100 Hz, and the cured product (P) not breaking under conditions of a stress amplitude of 2.8 MPa and a repetition number of up to $10^7$ times in a tensile shear fatigue property test in accordance with JIS K6864.

[2]

The two-pack type curable adhesive composition according to [1], where the cured product (P) has an elongation at break of 50% or greater.

[3]

The two-pack type curable adhesive composition according to [1] or [2], where the curing agent (B) contains a polyol compound (b1) and/or a polyamine compound (b2).

[4]

The two-pack type curable adhesive composition according to [3], where the polyol compound (b1) contains at least one selected from the group consisting of a polyoxyethylene polyol, a polyoxypropylene polyol, a polyoxyethylene polyoxypropylene polyol, a polybutadiene polyol, a polyisoprene polyol, a polyacrylic polyol, and partially modified products obtained by partially modifying each of them.

[5]

The two-pack type curable adhesive composition according to any one of [1] to [4], where the polymer particulates (X) contain a polymer obtained by reacting a polyisocyanate compound (x1) with at least one compound (x2) selected from the group consisting of a polyol compound, a polyamine compound, and a latent polyamine compound.

[6]

The two-pack type curable adhesive composition according to any one of [1] to [5], where the polymer particulates (X) contain a polymer obtained by reacting a maleic anhydride-modified oligomer (x3) with at least one compound (x4) selected from the group consisting of a polyol compound, a polyamine compound, and a latent polyamine compound.

[7]

The two-pack type curable adhesive composition according to any one of [1] to [6], where a cured product (M) obtained by curing a remainder obtained by removing the polymer particulates (X) from the two-pack type curable adhesive composition has a tensile modulus of elasticity of 5 MPa or more, and the polymer particulates (X) have a minimum value of a loss tangent of 0.05 or greater as measured under conditions of a temperature region of from −40° C. to +80° C. and a frequency of 100 Hz.

[8]

The two-pack type curable adhesive composition according to any one of [1] to [7], where the urethane prepolymer (a1) is obtained by reacting a polyisocyanate compound (a2) and a polyol compound (a3) at an equivalent ratio of an isocyanate group in the polyisocyanate compound (a2) to a hydroxyl group in the polyol compound (a3) of from 1.5 to 14, the curing agent (B) contains a polyol compound (b1) and a polyamine compound (b2), an equivalent ratio of an isocyanate group in the base (A) to an active hydrogen-containing group in the curing agent (B) is from 0.8 to 4, and an equivalent ratio of an isocyanate group in the base (A) to an amino group in the polyamine compound (b2) is from 1.2 to 6.

[9]

The two-pack type curable adhesive composition according to [8], where the polyol compound (a3) contains at least one selected from the group consisting of a polyester polyol, polytetramethylene ether glycol, a polycarbonate polyol, a polycaprolactone polyol, and partially modified products obtained by partially modifying each of them.

[10]

The two-pack type curable adhesive composition according to any one of [1] to [6], where a cured product (N) obtained by curing a remainder obtained by removing the polymer particulates (X) from the two-pack type curable adhesive composition has a minimum value of a loss tangent of 0.05 or greater as measured under conditions of a temperature region of from −40° C. to +80° C. and a frequency of 100 Hz, and the polymer particulates (X) have a tensile modulus of elasticity of 5 MPa or more.

[11]

The two-pack type curable adhesive composition according to any one of [1] to [6] and [10], where the urethane prepolymer (a1) is obtained by reacting a polyisocyanate compound (a2) and a polyol compound (a3) at an equivalence ratio of an isocyanate group in the polyisocyanate compound (a2) to a hydroxyl group in the polyol compound (a3) of from 1.5 to 2.5, the curing agent (B) contains a polyol compound (b1) and a polyamine compound (b2), an equivalent ratio of an isocyanate group in the base (A) to an active hydrogen-containing group in the curing agent (B) is from 0.8 to 4, and an equivalent ratio of an isocyanate group in the base (A) to an amino group in the polyamine compound (b2) is from 1.5 to 8.0.

[12]

The two-pack type curable adhesive composition according to [11], where the polyol compound (a3) contains at least one selected from the group consisting of polyoxypropylene glycol, a polybutadiene polyol, a polyisoprene polyol, a polyacrylic polyol, and partially modified products obtained by partially modifying each of them.

[13]

The two-pack type curable adhesive composition according to any one of [1] to [12], where a maximum value of the loss tangent of the cured product (P) measured under conditions of a temperature region of from −40° C. to +80° C. and a frequency of 100 Hz is 0.3 or greater.

[14]

The two-pack type curable adhesive composition according to any one of [1] to [13], where the polymer particulates (X) are polymer particulates obtained by crosslinking a crosslinkable oligomer or a crosslinkable polymer in at least one medium selected from the group consisting of water, an organic solvent, an oligomer, and a polymer.

Advantageous Effects of Invention

The two-pack type curable adhesive composition of the present invention can provide high fatigue durability and high damping performance in a compatible manner.

BRIEF DESCRIPTION OF DRAWINGS

FIG. 1 is a schematic view schematically illustrating an example of a section of a cured product (P) obtained by curing a two-pack type curable adhesive composition of the present invention.

DESCRIPTION OF EMBODIMENTS

Embodiments of the present invention will be described in detail below.

In the present specification, a numerical range represented by using "(from) . . . to . . . " includes the number before "to" as a lower limit value and the number after "to" as an upper limit value.

In the present specification, unless otherwise indicated, a substance corresponding to each component can be used alone or two or more types of substances can be used in combination. In a case where a component includes two or more types of substances, content of component means the total content of the two or more types of substances.

In the present specification, the case where at least one of high fatigue durability or high damping performance is more excellent may be referred to as "obtaining more excellent effects of the present invention".

Two-Pack Type Curable Adhesive Composition

A two-pack type curable adhesive composition of the present invention (composition of the present invention) includes:

a base (A) containing a urethane prepolymer (a1) having an isocyanate group; and a curing agent (B), at least one of the base (A) or the curing agent (B) containing polymer particulates (X) having an average particle size of from 0.01 to 200 μm, the polymer particulates (X) having a glass transition temperature of from −40° C. to +80° C., a content of the polymer particulates (X) being 5 mass % or greater in a total amount of the two-pack type curable adhesive composition, a cured product (P) obtained by curing the two-pack type curable adhesive composition having a loss tangent of 0.15 or greater under conditions of a temperature region of from −40° C. to +80° C. and a frequency of 100 Hz, and the cured product (P) not breaking under conditions of a stress amplitude of 2.8 MPa and a repetition number of up to $10^7$ times in a tensile shear fatigue property test in accordance with JIS K6864.

The composition of the present invention will be described in detail below.

The composition of the present invention is a two-pack type curable adhesive composition including a base (A)

containing a urethane prepolymer (a1) having an isocyanate group and a curing agent (B).

Base (A) In the present invention, the base (A) contains a urethane prepolymer (a1) having an isocyanate group.

Urethane Prepolymer (a1)

In the present invention, the urethane prepolymer (a1) has an isocyanate group. The urethane prepolymer (a1) preferably has a plurality of isocyanate groups per molecule.

From the viewpoint of obtaining more excellent effects of the present invention, the urethane prepolymer (a1) is preferably obtained by reacting a polyisocyanate compound (a2) and a polyol compound (a3) at an equivalence ratio (isocyanate group/hydroxyl group) of an isocyanate group in the polyisocyanate compound (a2) to a hydroxyl group in the polyol compound (a3) of from 1.5 to 14.

The urethane prepolymer (a1) may further contain an unreacted polyisocyanate compound (a2).

Polyisocyanate Compound (a2)

The polyisocyanate compound (a2) is a compound having a plurality of isocyanate groups per molecule.

The polyisocyanate compound (a2) is preferably an aromatic hydrocarbon compound having a plurality of isocyanate groups, and more preferably diphenylmethane diisocyanate or the like.

Polyol Compound (a3)

The polyol compound (a3) is a compound having a plurality of hydroxyl groups per molecule.

Examples of the polyol compound (a3) include polyoxyalkylene polyols such as polytetramethylene ether glycol, polyoxyethylene polyol, polyoxypropylene polyol, and polyoxyethylene polyoxypropylene polyol; polycarbonate polyols; and polyisoprene polyols.

Curing Agent (B)

In the present invention, the curing agent (B) is a concept corresponding to the base (A) in the two-pack type curable adhesive composition, and it means a typical curing agent in a broad sense.

The curing agent (B) typically contains a substantial curing agent (curing agent in a narrow sense) capable of reacting with the urethane prepolymer (a1) contained in the base (A).

Examples of the substantial curing agent (curing agent in a narrow sense) contained in the curing agent (B) include a compound having a plurality of active hydrogen-containing groups.

Examples of the active hydrogen-containing group include groups having active hydrogen, such as a hydroxyl group, an amino group, and an imino group.

From the viewpoint of obtaining more excellent effects of the present invention, the curing agent (B) preferably contains a polyol compound (b1) and/or a polyamine compound (b2) as the curing agent in a narrow sense, and more preferably contains the polyol compound (b1) and the polyamine compound (b2).

Polyol Compound (b1)

The polyol compound (b1) is a compound having a plurality of hydroxyl groups per molecule.

From the viewpoint of obtaining more excellent effects of the present invention, the polyol compound (b1) preferably contains at least one selected from the group consisting of a polyoxyethylene polyol, a polyoxypropylene polyol, a polyoxyethylene polyoxypropylene polyol, a polybutadiene polyol, polyisoprene polyol, a polyacrylic polyol, and partially modified products obtained by partially modifying each of them.

Examples of the modification in the polyol compound (b1) include compounds in which a polyester chain is introduced in a block form at the end of the polyoxyethylene polyols and the like exemplified above for the polyol compound (b1). The polyester modified product may have a plurality of hydroxy groups.

Polyamine Compound (b2)

The polyamine compound (b2) is a compound having a plurality of amino groups ($NH_2$) per molecule.

Examples of the polyamine compound (b2) include diethylmethylbenzenediamine (DETDA), 4,4'-methylenebis(2-chloroaniline), trimethylenebis(4-aminobenzoate), and dimethylthiotoluenediamine (DMTDA).

Polymer Particulates (X)

In the present invention, at least one of the base (A) or the curing agent (B) contains polymer particulates (X) having an average particle size of from 0.01 to 200 μm.

At least one of the base (A) or the curing agent (B) may contain the polymer particulates (X), or both of the base (A) and the curing agent (B) may contain the polymer particulates (X). From the viewpoint of obtaining more excellent effects of the present invention, it is preferable that at least the curing agent (B) contain polymer particulates (X).

Average Particle Size of Polymer Particulates (X)

In the present invention, the average particle size of the polymer particulates (X) is from 0.01 to 200 μm.

From the viewpoint of obtaining more excellent effects of the present invention, the average particle size of the polymer particulates (X) is preferably from 0.1 μm to 100 μm.

Method for Measuring Average Particle Size of Polymer Particulates (X)

In the present invention, the average particle size of the polymer particulates (X) means an average value of values obtained by measuring diameters of any 10 polymer particulates (X) selected from the polymer particulates (X) photographed at a magnification of 2000 times using a scanning electron microscope (SEM).

Glass Transition Temperature of Polymer Particulates (X)

In the present invention, the glass transition temperature (Tg) of the polymer particulates (X) is from −40° C. to +80° C. The Tg may be in a range from −40° C. to +80° C.

From the viewpoint of obtaining more excellent effects of the present invention, the Tg is preferably from −35 to +55° C.

In the present invention, the glass transition temperature (Tg) of the polymer particulates (X) is a temperature indicating a peak value (maximum value) of tan δ obtained by performing forced extension excitation on a cured product (the cured product corresponds to (H) described later) under conditions of a strain of 0.01%, a frequency of 100 Hz, and a heating rate of 5° C./min in a temperature region of from −50° C. to +120° C. using dynamic mechanical analysis. The cured product is obtained by not using a medium described later when the polymer particulates (X) are produced but leaving the remaining components for 7 days under conditions of 23° C. and 55% RH (relative humidity) and then curing the components.

Skeleton of Polymer Constituting Polymer Particulate (X)

The skeleton of the polymer constituting the polymer particulates (X) is not particularly limited. The skeleton preferably has a skeleton of polyurethane or a conjugated diene rubber.

The polyurethane as the skeleton is a polymer having a urethane bond and/or a urea bond (for example, polymer particulates 1 to 3, 5, and 6 described later).

To obtain the conjugated diene rubber as the skeleton, it is only required that the monomers constituting the conjugated diene rubber contain at least a conjugated diene. Examples of the conjugated diene rubber include polybutadiene and polyisoprene (for example, polymer particulates 4 and 7 described later).

Crosslinking The polymer constituting the polymer particulates (X) is preferably crosslinked from the viewpoint of obtaining more excellent effects of the present invention.

Examples of the crosslinking include bonding between the skeletons via a urethane bond, a urea bond, an ester bond, or an amide bond.

When the skeleton is polyurethane, crosslinking is preferably performed via a urethane bond or a urea bond.

When the skeleton is a conjugated diene rubber, crosslinking is preferably performed via an ester bond or an amide bond, and more preferably performed via an amide bond.

Crosslinking Point being Urethane Bond and/or Urea Bond

From the viewpoint of obtaining more excellent effects of the present invention, one preferable aspect is that the polymer particulates (X) contain a polymer obtained by reacting the polyisocyanate compound (x1) with at least one compound (x2) selected from the group consisting of a polyol compound, a polyamine compound, and a latent polyamine compound (for example, polymer particulates 1 to 3, 5, and 6 described later).

Polyisocyanate Compound (x1)

The polyisocyanate compound (x1) that may be used in the production of the polymer particulates (X) is a compound having a plurality of isocyanate groups. The polyisocyanate compound (x1) preferably contains a urethane prepolymer (for example, each urethane prepolymer used in the production of polymer particulates 1 to 3, 5, and 6 described later). Examples of the urethane prepolymer include the same urethane prepolymers (a1) as described above.

When the polyisocyanate compound (x1) contains a urethane prepolymer, the polyisocyanate compound used in the production of the urethane prepolymer may be further contained. The polyisocyanate compound used in the production of the urethane prepolymer may be an unreacted product in the production, or may be further added after the production.

Compound (x2)

The compound (x2) that may be used in the production of the polymer particulates (X) preferably contains at least one selected from the group consisting of a polyol compound, a polyamine compound, and a latent polyamine compound (specific examples include the cases of polymer particulates 1 to 3, 5, and 6 described later).

Polyol Compound

From the viewpoint of more efficient production of the polymer particulates (X), one preferable aspect is that the polyol compound as the compound (x2) has a molecular weight of 3000 or less.

Examples of the polyol compound having a molecular weight of 3000 or less include low molecular weight polyols such as butanediol, 1,6-hexanediol, 3-methyl-1,5-pentanediol, 1,9-nonanediol, glycerin, trimethylolpropane, and triethanolamine; polyisoprene polyols, polybutadiene polyols, polyacrylic polyols, and polycarbonate polyols (specific examples include the cases of polymer particulates 1 to 3 described later).

When the polyol compound as the compound (x2) is a polymer polyol (such as the polyisoprene polyols described above), the molecular weight of the polymer polyol may be a number-average molecular weight.

Polyamine Compound

The polyamine compound as the compound (x2) that may be used in the production of the polymer particulates (X) is a compound having a plurality of amino groups ($NH_2$) per molecule. Examples of the polyamine compound include the same compound as the polyamine compound (b2) as the curing agent in a narrow sense described above (specific examples include polymer particulates 5 and 6 described later).

Latent Polyamine Compound

The latent polyamine compound as the compound (x2) that may be used in the production of the polymer particulates (X) is a compound having a plurality of latent amino groups. Examples of the latent amino group include an oxazolidine ring. Examples of the latent polyamine compound include an oxazolidine compound represented by the following Formula (1).

[Chemical Formula 1]

(1)

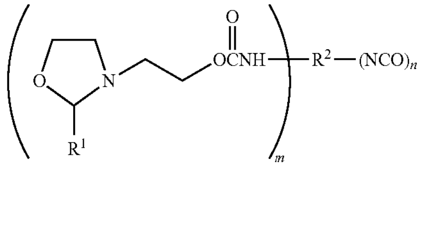

In Formula (1), $R^1$ represents a hydrocarbon group, $R^2$ represents a linking group having a valence of m+n, m is an integer of 1 to 6, and n is an integer of 0 to 4.

In Formula (1), $R^1$ represents a hydrocarbon group.

Examples of the hydrocarbon group include aliphatic hydrocarbon groups (straight, branched, or cyclic), aromatic hydrocarbon groups, and combinations thereof.

From the viewpoint of obtaining more excellent effects of the present invention, the hydrocarbon group is preferably an aliphatic hydrocarbon group, more preferably an aliphatic hydrocarbon group having 5 to 15 carbon atoms.

In Formula (1), $R^2$ represents a linking group having a valence of m+n.

Examples of the linking group include a hydrocarbon group. Examples of the hydrocarbon group include aliphatic hydrocarbon groups (straight, branched, or cyclic), aromatic hydrocarbon groups, and combinations thereof. The hydrocarbon group may have a hetero atom such as an oxygen atom, a nitrogen atom, or a sulfur atom.

Examples of the linking group include aromatic aliphatic groups such as xylene.

In Formula (1), m is an integer of 1 to 6. In particular, 2 to 3 is preferable in terms of curability and physical properties of a cured product.

In Formula (1), n is an integer of 0 to 4. In particular, 0 to 1 is preferable from the viewpoint of curability.

Examples of the oxazolidine-based compound include a compound represented by the following Formula (IV).

Since the compound (x4) has high reactivity with the maleic anhydride-modified oligomer (x3), the compound (x4) preferably contains at least one selected from the group consisting of a polyamine compound and a latent polyamine compound, and more preferably contains a latent polyamine compound.

Content of Polymer Particulates (X)

In the present invention, the content of the polymer particulates (X) is 5 mass % or greater in the total amount of the composition of the present invention.

From the viewpoint of obtaining more excellent effects of the present invention, the content of the polymer particulates (X) is preferably from 5 to 30 mass %, and more preferably from 10 to 20 mass % with respect to the total amount of the composition of the present invention.

Note that the content of the polymer particulates (X) does not include the amount of a medium described later that may be used in the production of the polymer particulates (X).

Method for Producing Polymer Particulates (X)

Examples of the method for producing the polymer particulates (X) include a method in which a crosslinkable oligomer or a crosslinkable polymer (the crosslinkable oligomer or the crosslinkable polymer is a raw material of the polymer particulates (X)) is crosslinked in at least one medium selected from the group consisting of water, an organic solvent, an oligomer, and a polymer to form polymer particulates.

[Chemical Formula 2]

(IV)

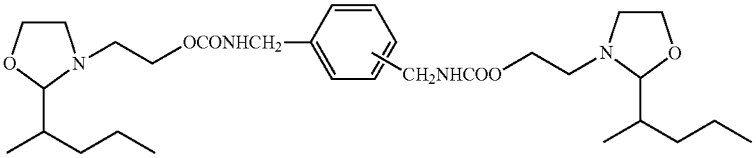

Crosslinking Point being Ester Bond and/or Amide Bond

From the viewpoint of obtaining more example effects of the present invention, one preferable aspect is that the polymer particulates (X) contain a polymer obtained by reacting a maleic anhydride-modified oligomer (x3) with at least one compound (x4) selected from the group consisting of a polyol compound, a polyamine compound, and a latent polyamine compound (specific examples include the cases of polymer particulates 4 and 7 described later).

Maleic Anhydride-Modified Oligomer (x3)

The maleic anhydride-modified oligomer (x3) that may be used in the production of the polymer particulates (X) is an oligomer having a maleic anhydride group. Examples of the skeleton of the maleic anhydride-modified oligomer (x3) include a conjugated diene rubber. Examples of the conjugated diene rubber include polybutadiene and polyisoprene.

Compound (x4)

The compound (x4) that may be used in the production of the polymer particulates (X) is the same as the compound (x2) described above.

Crosslinkable Oligomer or Crosslinkable Polymer (Raw Material of Polymer Particulates (X))

The crosslinkable oligomer as a raw material of the polymer particulates (X) that may be used in the production of the polymer particulates (X) is an oligomer having crosslinkability. The crosslinkable polymer as a raw material of the polymer particulates (X) is a polymer having crosslinkability (excluding the crosslinkable oligomer).

Examples of the crosslinkable oligomer as a raw material of the polymer particulates (X) include urethane prepolymers as the polyisocyanate compound (x1) (for example, urethane prepolymers used in the production of polymer particulates 1 to 3, 5, and 6 described later). Specific examples of the urethane prepolymer include the urethane prepolymer (a1).

Examples of the crosslinkable polymer as a raw material of the polymer particulates (X) include a maleic anhydride-modified oligomer (x3), and specific examples thereof include maleic anhydride-modified polybutadienes (for example, maleic anhydride-modified polybutadienes used in the production of polymer particulates 4 and 7 described later).

Crosslinking

Crosslinking of the crosslinkable oligomer in the medium may be either a case where the crosslinkable oligomers are crosslinked with each other or a case where the crosslinkable oligomer is crosslinked via a crosslinking agent.

The same applies to crosslinking of the crosslinkable polymer in the medium.

Examples of the crosslinking agent include the compound (x2) and the compound (x4) described above.

The polymer particulates (X) can be produced by reacting a mixture containing a crosslinkable oligomer or a crosslinkable polymer, the medium, and a crosslinking agent that may be used as necessary, for example, under a condition of from 20 to 40° C. with stirring.

Medium

The medium that may be used in the production of the polymer particulates (X) contains at least one selected from the group consisting of water, an organic solvent, an oligomer, and a polymer.

The medium can serve as a dispersion medium in which the polymer particulates (X) are dispersed after the polymer particulates (X) are produced.

The medium preferably contains an oligomer and/or a polymer, and more preferably contains an oligomer, from the viewpoint of obtaining more excellent effects of the present invention and efficiently producing the polymer particulates (X). Examples of the oligomer as the medium include a urethane prepolymer and a polyoxyalkylene polyol.

The medium used in the production of the polymer particulates (X) can serve as a medium in which the polymer particulates (X) are dispersed after the polymer particulates (X) are produced. Alternatively, after the production of the polymer particulates (X) in the presence of a medium, the medium may be further reacted in a state where the medium contains the polymer particulates (X), and the polymer particulates (X) may be dispersed in the reacted medium.

In the present invention, the "medium" refers to a medium used in the production of the polymer particulates (X) or a medium (dispersion medium) in which the polymer particulates (X) are dispersed after the production of the polymer particulates (X).

The medium is preferably liquid at room temperature (23° C.).

Oligomer as Medium

When the base (A) contains the polymer particulates (X), the oligomer as the medium preferably contains a urethane prepolymer from the viewpoint of obtaining more excellent effects of the present invention and efficiently producing the polymer particulates (X). Examples of the urethane prepolymer as a medium include the same urethane prepolymer as the urethane prepolymer (a1) described above. When the polymer particulates (X) are produced by using, for example, the polyol compound (a3) as a medium, the polymer particulates (X) are dispersed in the polyol compound (a3) after the formation of the polymer particulates (X), and the polyisocyanate compound (a2) may be added thereto to react the polyisocyanate compound (a2) with the polyol compound (a3) to form a urethane prepolymer as a final medium. In this case, the polymer particulates (X) can be dispersed in the urethane prepolymer as the final medium.

When the base (A) contains a urethane prepolymer as a medium together with the polymer particulates (X), part or all of the urethane prepolymer (a1) contained in the base (A) may be the urethane prepolymer as the medium.

When the base (A) contains a urethane prepolymer as a medium together with the polymer particulates (X) and part of the urethane prepolymer (a1) is the urethane prepolymer as the medium, another urethane prepolymer may be separately added later to the mixture of the polymer particulates (X) and the urethane prepolymer as the medium.

On the other hand, when the curing agent (B) contains the polymer particulates (X), the oligomer as a medium preferably contains a polyoxyalkylene polyol, and more preferably contains a polyoxypropylene polyol and/or a polytetramethylene glycol, from the viewpoint of obtaining more excellent effects of the present invention and efficiently producing the polymer particulates (X). The polyoxypropylene polyol described above with respect to the oligomer as a medium includes the concept of a polyoxyethylene polyoxypropylene polyol.

When the curing agent (B) contains a polyoxyalkylene polyol as a medium together with the polymer particulates (X), part or all of the polyol compound (b1) that the curing agent (B) may contain may be polyoxyalkylene polyol as the medium.

When the curing agent (B) contains a polyoxyalkylene polyol as a medium together with the polymer particulates (X) and part of the polyol compound (b1) that the curing agent (B) may contain is the polyoxyalkylene polyol as the medium, a polyoxyalkylene polyol may be further separately added later to the mixture of the polymer particulates (X) and the polyoxyalkylene polyol as the medium.

In the combination of the medium and the raw materials of the polymer particulates (X) in the production of the polymer particulates (X), the oligomer or polymer as the medium is preferably a compound different from the crosslinkable oligomer, the crosslinkable polymer, or the crosslinking agent (compound (x2), compound (x4)) as the raw materials of the polymer particulates (X).

For the medium in the production of the polymer particulates (X), when the base (A) contains the (X) and the polymer particulates (X) are accompanied by a medium, the medium used in the production of the polymer particulates (X) preferably contains an oligomer (polyoxyalkylene polyol) such as polytetramethylene glycol from the viewpoint of obtaining excellent mixability with the base (A) and excellent storage stability. The weight-average molecular weight of the oligomer is preferably less than 10000. As described above, the polyisocyanate compound (a2) may be further added to the polyol compound (a3) in a state where the polymer particulates (X) are dispersed to react the polyisocyanate compound (a2) with the polyol compound (a3) to form a urethane prepolymer as a final medium, and the urethane prepolymer may be used as the urethane prepolymer (a1).

In the case where the curing agent (B) contains the polymer particulates (X) and the polymer particulates (X) are accompanied by a medium, the medium in the production of the polymer particulates (X) preferably contains an oligomer (polyoxyalkylene polyol) such as polyoxypropylene diol from the viewpoint of obtaining excellent mixability with the curing agent (B) and excellent storage stability. The weight-average molecular weight of the oligomer is preferably less than 10000.

When the polymer particulates (X) are accompanied by a medium, the amount of the medium is preferably from 70 to 400 parts by mass, and more preferably from 100 to 400 parts by mass with respect to 100 parts by mass of the polymer particulates (X) from the viewpoint of obtaining more excellent effects of the present invention and excellent storage stability.

Loss Tangent of Cured Product (P)

In the present invention, the loss tangent of the cured product (P) obtained by curing the composition of the present invention is 0.15 or greater under the conditions of a temperature region of from −40° C. to +80° C. and a frequency of 100 Hz (hereinafter, this may be referred to as "under specific conditions"). That is, the minimum value of the loss tangent of the cured product (P) measured under a frequency of 100 Hz is 0.15 or greater in the temperature region of from −40° C. to +80° C.

When the loss tangent of the cured product (P) is 0.15 or greater under the specific conditions described above, the present invention is excellent in damping performance. The larger the value of the value of the loss tangent of the cured product (P), the more excellent the damping performance is.

The loss tangent (minimum value) of the cured product (P) in the temperature region of from −40° C. to +80° C. is preferably 0.2 or greater under the specific conditions described above, from the viewpoint of obtaining more excellent effects of the present invention.

The maximum value of the loss tangent of the cured product (P) measured under the specific conditions is not particularly limited, but is preferably 0.3 or greater from the viewpoint of obtaining more excellent effects of the present invention and capability of maintaining excellent elongation at break and the like.

Tensile Shear Fatigue Property Test of Cured Product (P)

In the present invention, the cured product (P) obtained by curing the composition of the present invention does not break (withstands without breaking) under the conditions of a stress amplitude of 2.8 MPa and a repetition number of up to $10^7$ times in a tensile shear fatigue property test in accordance with JIS K 6864.

In the present invention, when the cured product (P) does not break in the tensile shear fatigue property test at a stress amplitude of 2.8 MPa and a repetition number of up to $10^7$, the present invention is considered to have excellent fatigue durability. In addition, the tensile shear fatigue property test was repeated up to $10^7$ times for each increase in the stress amplitude in the same manner as described above except that the stress amplitude was increased from 2.8 MPa, and the cured product (P) was evaluated to be more excellent in fatigue durability as the stress amplitude when the cured product (P) was broken for the first time was larger than 2.8 MPa.

Elongation at Break of Cured Product (P)

The elongation at break of the cured product (P) obtained by curing the composition of the present invention is preferably 50% or greater, more preferably from 100 to 1000%, from the viewpoint of obtaining more excellent fatigue durability.

Aspect of Cured Product (P)

The cured product (P) obtained by curing the composition of the present invention may contain the polymer particulates (X) and a matrix obtained by removing the polymer particulates (X) from the composition of the present invention.

A portion obtained by removing only the polymer particulates (X) from the composition of the present invention may be referred to as a "matrix" (the same applies hereinafter).

In the present invention, when the polymer particulates (X) are used as a mixture with the above-described medium, the composition of the present invention excluding the polymer particulates (X) and the medium may be referred to as a "remainder" (the same applies hereinafter).

The cured product (P) obtained by curing the composition of the present invention will be described below with reference to the accompanying drawings. The present invention is not limited to the accompanying drawings.

FIG. 1 is a schematic view schematically illustrating an example of a section of the cured product (P) obtained by curing the two-pack type curable adhesive composition of the present invention.

In FIG. 1, a cured product (P) 10 of the two-pack type curable adhesive composition of the present invention includes polymer particulates (X) 14 and a cured product 12 of a matrix obtained by removing the polymer particulates (X) from the composition of the present invention.

In the related art, fatigue durability and damping performance are in a trade-off relationship in the cured product (P). However, the present inventors have reached the idea that, when the cured product (P) includes the polymer particulates (X) and the matrix (a portion other than the polymer particulates (X)), and fatigue durability is imparted to one of the polymer particulates (X) and the matrix, and damping performance is imparted to the other of the polymer particulates (X) and the matrix, fatigue durability and damping performance can be provided in a compatible manner in the cured product (P).

That is, when the polymer particulates (X) are mainly responsible for damping performance, the matrix is mainly responsible for fatigue durability, and when the polymer particulates (X) are mainly responsible for fatigue durability, the matrix is mainly responsible for damping performance.

By including the polymer particulates (X) and the matrix having different functions like this, the composition of the present invention can provide high fatigue durability and high damping performance in a compatible manner as a whole.

In the present specification, the case where the polymer particulates (X) are mainly responsible for damping performance and the matrix is mainly responsible for fatigue durability may be referred to as "Method 1", and the case where the polymer particulates (X) are mainly responsible for fatigue durability and the matrix is mainly responsible for damping performance may be referred to as "Method 2".

As an aspect of the cured product (P), Method 1 is preferable from the viewpoint of obtaining more excellent effects of the present invention.

In addition, the present inventors have found that, in the cured product (P), the tensile modulus of elasticity of the cured product at a portion having fatigue durability is preferably 5 MPa or more, and the minimum value of the loss tangent of a portion having damping performance of the cured product under the specific conditions is preferably 0.05 or greater.

In the above case, the cured product of the portion having fatigue durability has a loss tangent under the above specific conditions, but the minimum value thereof is preferably less than 0.15. In addition, the tensile modulus of elasticity of the portion having damping performance of the cured product is, usually, preferably less than 5 MPa.

In order to set the tensile modulus of elasticity of the cured product (cured product of the matrix or the remainder in Method 1 or the polymer particulates (X) in Method 2) at the portion having fatigue durability in the cured product (P) to 5 MPa or more, for example, the index in the production of the urethane prepolymer (a1) in Method 1 is set to 3.5 or greater; the hydrocarbon group constituting the polyol compound (a3) used in the production of the urethane prepolymer (a1) in Method 1 or the urethane prepolymer as a raw material of the polymer particulates (X) in Method 2 is linear (for example, a polyoxyethylene polyol, PTMG); or a compound having 3 or more active hydrogens is used as a curing agent in a narrow sense in the curing agent (B) (it is preferable that the use amount of the compound in the matrix in Method 1 be larger than that in Method 2).

From the viewpoint of obtaining more excellent effects of the present invention, the minimum value of the loss tangent of the cured product (polymer particulates (X) in Method 1 or cured product of the matrix or the remainder in Method 2) at the portion having damping performance in the cured product (P) under the specific conditions described above is preferably 0.05 or greater, and more preferably 0.15 or greater.

In order to set the minimum value of the loss tangent of the cured product at the portion having damping performance in the cured product (P) to 0.05 or greater (more preferably 0.15 or greater) under the specific conditions described above, for example, the index in the production of the urethane prepolymer (a1) in Method 2 is set to 3.0 or less; the hydrocarbon group constituting the urethane prepolymer (a1) in Method 2 or the polyol compound (a3) used in the production of the urethane prepolymer as a raw material of the polymer particulates (X) in Method 1 is branched (for example, a polyoxypropylene polyol, a polyisoprene polyol); or a compound having 2 or less active hydrogens is used as a curing agent in a narrow sense in the curing agent (B) (it is preferable that the use amount of the compound in the matrix in Method 2 be smaller than that in Method 1).

Method 1

In the cured product (P) of the composition of the present invention, when the polymer particulates (X) mainly responsible for damping performance and the matrix mainly responsible for fatigue durability (Method 1), from the viewpoint of obtaining more excellent effects of the present invention, it is preferable that the tensile modulus of elasticity of the cured product (M) obtained by curing the matrix (a portion obtained by removing the polymer particulates (X) and a medium from composition of the present invention when the polymer particulates (X) are accompanied by a medium) obtained by removing the polymer particulates (X) from the composition of the present invention be 5 MPa or more, and the polymer particulates (X) have preferably a minimum value of the loss tangent of 0.05 or greater as measured under the conditions of a temperature region of from −40° C. to +80° C. and a frequency of 100 Hz.

Loss Tangent of Polymer Particulates (X) in Method 1

Minimum Value of Loss Tangent

In Method 1, the minimum value of the loss tangent of the polymer particulates (X) is preferably 0.05 or greater, more preferably 0.15 or greater, and still more preferably 0.2 or greater under the specific conditions described above from the viewpoint of obtaining more excellent effects of the present invention.

Maximum Value of Loss Tangent

In Method 1, the maximum value of the loss tangent of the polymer particulates (X) is preferably 0.3 or greater, more preferably 0.5 or greater, and still more preferably 0.8 or greater under the specific conditions described above from the viewpoint of obtaining more excellent effects of the present invention.

In Method 1, the upper limit of the loss tangent of the polymer particulates (X) under the specific conditions described above is not particularly limited, but is preferably 2.0 or less, more preferably 1.5 or less from the viewpoint of obtaining more excellent effects of the present invention and capability of maintaining excellent elongation at break.

Tensile Modulus of Elasticity of Polymer Particulates (X) in Method 1

In Method 1, the tensile modulus of elasticity of the polymer particulates (X) is preferably from 0.5 to 50 MPa from the viewpoint of obtaining more excellent effects of the present invention.

Examples of Polymer Particulates (X) in Method 1

The polymer particulates (X) in Method 1 are not particularly limited as long as they are, for example, a reaction product obtained by reacting a polyisocyanate compound (x1) or a maleic anhydride-modified oligomer (x3) with a compound (x2), the minimum loss tangent of the reaction product is 0.05 or greater under the specific conditions, and the glass transition temperature of the reaction product is from −40° C. to +80° C.

Examples of the urethane prepolymer as the polyisocyanate compound (x1) include a reaction product obtained by reacting an aromatic polyisocyanate such as MDI with at least one selected from the group consisting of polyoxyalkylene polyols (for example, polyoxypropylene polyols, polyoxyethylene polyols, and polytetramethylene ether glycol), polycarbonate polyols, and polyisoprene polyols.

The maleic anhydride-modified oligomer (x3) is the same as described above. The maleic anhydride-modified oligomer (x3) preferably contains a maleic anhydride-modified polybutadiene.

The compound (x2) is the same as described above.

One preferable aspect is that the polyisocyanate compound (x1) is reacted with a polyol compound as the compound (x2) to form the polymer particulates (X) in Method 1. The polyol compound preferably contains a low molecular weight polyol such as butanediol.

When the polyisocyanate compound (x1) is reacted with a polyamine compound as the compound (x2) to form the polymer particulates (X) in Method 1, the molar ratio (index) of the isocyanate group of the polyisocyanate compound (x1) with respect to the amino group ($NH_2$ group) of the polyamine compound is adjusted so that the resulting polymer particulates (X) has a minimum value of the loss tangent of 0.05 or greater under the specific conditions described above and a glass transition temperature of from −40° C. to +80° C.

Also when the maleic anhydride-modified oligomer (x3) is reacted with a latent polyamine as the compound (x2) to form the polymer particulates (X) in Method 1, the molar ratio (index) of the maleic anhydride group of the maleic anhydride-modified oligomer (x3) with respect to the amino group ($NH_2$ group) of the latent polyamine compound is adjusted so that the minimum value of the loss tangent and the glass transition temperature of the resulting polymer particulates (X) fall within the above ranges.

Tensile Modulus of Elasticity of Cured Product (M) Obtained by Method 1

In Method 1, from the viewpoint of obtaining more excellent effects of the present invention, the tensile modulus of elasticity of the cured product (M) obtained by curing the matrix obtained by removing the polymer particulates (X) from the composition of the present invention (or the remainder obtained by removing the polymer particulates (X) and the medium from the composition of the present invention) is preferably 5 MPa or more, and more preferably from 100 to 250 MPa.

Loss Tangent of Cured Product (M) in Method 1

In Method 1, the loss tangent of the cured product (M) is preferably in the range of from 0.05 to 0.2, and more preferably in the range of 0.05 or greater and less than 0.15 under the specific conditions from the viewpoint of obtaining more excellent effects of the present invention.

Example of Cured Product (M) in Method 1

In Method 1, from the viewpoint of obtaining more excellent effects of the present invention and having a tensile modulus of elasticity of the cured product (M) of 5 MPa or more, it is preferable that the urethane prepolymer (a1) be obtained by reacting the polyisocyanate compound (a2) and the polyol compound (a3) at an equivalent ratio (NCO/OH) of an isocyanate group in the polyisocyanate compound (a2) to a hydroxyl group in the polyol compound (a3) of from 1.5 to 14,

- the curing agent (B) contains a polyol compound (b1) and a polyamine compound (b2),
- an equivalent ratio of an isocyanate group in the base (A) to an active hydrogen-containing group in the curing agent (B) is from 0.8 to 4, and
- an equivalent ratio of an isocyanate group in the base (A) to an amino group in the polyamine compound (b2) is from 1.2 to 6.

When the polymer particulates (X) are accompanied by a polyol as a medium and the polymer particulates (X) are added to the curing agent (B) together with the medium, the amount of the active hydrogen-containing group of the polyol as the medium is added to the amount of the active hydrogen-containing group of the curing agent (B) (the same applies hereinafter, and the same applies in Method 2).

Preferred Embodiment of Cured Product (M) in Method 1

The equivalent ratio (NCO/OH) in the production of the urethane prepolymer (a1) is preferably from 3 to 14, and more preferably from 4 to 10 from the viewpoint of obtaining more excellent effects of the present invention.

The equivalent ratio of the isocyanate group in the base (A) to the active hydrogen-containing group in the curing agent (B) is preferably from 0.5 to 4 from the viewpoint of obtaining more excellent effects of the present invention.

The equivalent ratio of the isocyanate group in the base (A) to the amino group in the polyamine compound (b2) is preferably from 0.8 to 4 from the viewpoint of obtaining more excellent effects of the present invention.

In Method 1, the polyol compound (a3) that may be used in the production of the urethane prepolymer (a1) preferably contains at least one selected from the group consisting of a polyester polyol, polytetramethylene ether glycol, a polycarbonate polyol, a polycaprolactone polyol, and partially modified products obtained by partially modifying each of them from the viewpoint of obtaining more excellent effects of the present invention and capability of having a tensile modulus of elasticity of the cured product (M) of MPa or more.

Examples of the modification in the polyol compound (a3) include introduction of a functional group such as a methyl group.

Method 2

When the polymer particulates (X) are mainly responsible for fatigue durability and the matrix is mainly responsible for damping performance (Method 2) in the cured product (P) of the composition of the present invention, the cured product (N) obtained by curing the remainder obtained by removing the polymer particulates (X) from the composition of the present invention preferably has a minimum value of the loss tangent of 0.05 or greater and a tensile modulus of elasticity of 5 MPa or more as measured under conditions of a temperature region of from −40° C. to +80° C. and a frequency of 100 Hz from the viewpoint of obtaining more excellent effects of the present invention.

Loss Tangent of Cured Product (N) in Method 2

Minimum Value of Loss Tangent

In Method 2, from the viewpoint of obtaining more excellent effects of the present invention, the minimum value of the loss tangent of the cured product (N) obtained by curing the matrix obtained by removing the polymer particulates (X) from the composition of the present invention (or the remainder obtained by removing the polymer particulates (X) and the medium from the composition of the present invention) is preferably 0.05 or greater, more preferably 0.1 or greater, and still more preferably 0.2 or greater under the specific conditions described above.

Maximum Value of Loss Tangent

In Method 2, from the viewpoint of obtaining more excellent effects of the present invention, the maximum value of the loss tangent of the cured product (N) is preferably 0.3 or greater, more preferably 0.5 or greater, and still more preferably 0.6 or greater under the specific conditions described above.

In Method 2, the upper limit of the loss tangent of the cured product (N) under the specific conditions is not particularly limited, but is preferably 2.0 or less, more preferably 1.0 or less from the viewpoint of obtaining more excellent effects of the present invention and capability of maintaining excellent elongation at break.

As described above, when the polymer particulates (X) are used as a mixture with the medium, the remainder is obtained by removing the polymer particulates (X) and the medium from the composition of the present invention.

Tensile Modulus of Elasticity of Cured Product (N) in Method 2

In Method 2, the tensile modulus of elasticity of the cured product (N) is preferably from 0.5 to 50 MPa from the viewpoint of obtaining more excellent effects of the present invention.

Tensile Modulus of Elasticity of Polymer Particulates (X) in Method 2

In Method 2, the tensile modulus of elasticity of the polymer particulates (X) is preferably 5 MPa or more, more preferably from 70 to 300 MPa, and still more preferably from 100 to 250 MPa from the viewpoint of obtaining more excellent effects of the present invention.

Loss Tangent of Polymer Particulates (X) in Method 2

In Method 2, the loss tangent of the polymer particulates (X) is preferably in the range of from 0.05 to 0.4, and more preferably in the range of 0.1 or greater and less than 0.15 under the specific conditions described above from the viewpoint of obtaining more excellent effects of the present invention.

Example of Cured Product (N) in Method 2

In Method 2, from the viewpoint of obtaining more excellent effects of the present invention and capability of obtaining a minimum loss tangent of the cured product (N) of 0.05 or greater (more preferably 0.1 or greater), it is preferable that the urethane prepolymer (a1) be obtained by reacting a polyisocyanate compound (a2) and a polyol compound (a3) at an equivalent ratio of an isocyanate group in the polyisocyanate compound (a2) to a hydroxyl group in the polyol compound (a3) of from 1.5 to 2.5,

- the curing agent (B) contain a polyol compound (b1) and a polyamine compound (b2),
- an equivalent ratio of an isocyanate group in the base (A) to an active hydrogen-containing group in the curing agent (B) be from 0.8 to 4, and
- an equivalent ratio of an isocyanate group in the base (A) to an amino group in the polyamine compound (b2) be from 1.5 to 8.0.

Preferred Embodiment of Cured Product (N) in Method 2

The equivalent ratio of the isocyanate group in the base (A) to the active hydrogen-containing group in the curing agent (B) is preferably from 0.5 to 4 from the viewpoint of obtaining more excellent effects of the present invention.

The equivalent ratio of the isocyanate group in the base (A) to the amino group in the polyamine compound (b2) is preferably from 2 to 8.

In Method 2, the polyol compound (a3) preferably contains at least one selected from the group consisting of polyoxypropylene glycol, a polybutadiene polyol, a polyisoprene polyol, a polyacrylic polyol, and partially modified products obtained by partially modifying each of them.

Examples of the modification in the polyol compound (a3) include introduction of a functional group such as a methyl group.

Additives

The composition according to an embodiment of the present invention can further contain additives. Examples of the additive include fillers such as carbon black, calcium carbonate, and silica, plasticizers, and antioxidants. The type and content of the additive can be appropriately selected. Which of the base (A) and the curing agent (B) contains each additive can be appropriately selected.

Production Method

Examples of a method for producing the composition of the present invention include a method in which a mixture of the urethane prepolymer (a1) and an additive that may be appropriately used as necessary is prepared as the base (A), a mixture of the curing agent in a narrow sense and an additive that may be appropriately used as necessary is prepared as the curing agent (B), and the polymer particulates (X) are added to at least one of the base (A) or the curing agent (B) in the preparation.

When the polymer particulates (X) are added to the base (A), the polymer particulates (X) are preferably a mixture with a urethane prepolymer (as a medium). The polymer particulates (X) preferably have an isocyanate group.

When the polymer particulates (X) are added to the curing agent (B), the polymer particulates (X) are preferably a mixture with a polyoxyalkylene polyol such as polypropylene glycol (as a medium).

Method of Use

The composition of the present invention can be prepared by mixing the base (A) and the curing agent (B).

Application

The composition of the present invention can be used as an adhesive.

Examples of the base material to which the composition of the present invention can be applied include metal, plastic, rubber, and glass.

One preferable aspect is that one or both of the first base material and the second material are made of metal when a first base material and a second material are bonded to each other by using the composition of the present invention.

The composition of the present invention can be used as, for example, an adhesive for automobiles and an adhesive for earthquake resistance.

EXAMPLES

An embodiment of the present invention will be described below in detail by way of examples. However, an embodiment of the present invention is not limited to such examples.

Synthesis of Urethane Prepolymer

Synthesis of Urethane Prepolymer 1

100 g of polytetramethylene ether glycol (PTMG1000 (weight-average molecular weight of 1000, OH2 functional), available from Mitsubishi Chemical Corporation, the same applies hereinafter) and 100 g of 4,4'-diphenylmethane diisocyanate (index 4.0) were reacted with stirring for 4 hours at 80° C. in a nitrogen atmosphere to synthesize a urethane prepolymer 1.

Note that the index in the production of the urethane prepolymer is the equivalent ratio (molar ratio) of the NCO group contained in the polyisocyanate compound (a2) to the OH group contained in the polyol compound (a3) (the same applies hereinafter).

Synthesis of Urethane Prepolymer 2

100 g of polytetramethylene ether glycol and 150 g of 4,4'-diphenylmethane diisocyanate (index 6.0) were reacted with stirring for 4 hours at 80° C. in a nitrogen atmosphere to synthesize a urethane prepolymer 2.

Synthesis of Urethane Prepolymer 3

100 g of polycarbonate diol (DURANOL T6001 (weight-average molecular weight of 1000), available Asahi Kasei Corporation, OH2 functional) and 50 g of 4,4'-diphenylmethane diisocyanate (index 2.0) were reacted with stirring for 4 hours at 80° C. in a nitrogen atmosphere to synthesize a urethane prepolymer 3.

Synthesis of Urethane Prepolymer 4

100 g of polyoxypropylene glycol (Sannix FA-921 (hydroxyl value of 27.9 mg/KOHg), OH2 functional, available from Sanyo Chemical Industries, Ltd.) and 16 g of 4,4'-diphenylmethane diisocyanate (index 2.5) were reacted with stirring for 4 hours at 80° C. in a nitrogen atmosphere to synthesize a urethane prepolymer 4.

Synthesis of Urethane Prepolymer 5

100 g of polyisoprene polyol (Poly ip (number-average molecular weight of 2500, OH2 functional), available from Idemitsu Kosan Co., Ltd.) and 14 g of 4,4'-diphenylmethane diisocyanate (index 2.0) were reacted with stirring for 4 hours at 80° C. in a nitrogen atmosphere to synthesize a urethane prepolymer 5.

Synthesis of Polymer Particulates (X)

Synthesis of Polymer Particulates 1

In 311 g of polyoxypropylene glycol (Sannix GL-3000, available from Sanyo Chemical Industries, Ltd., OH3 functional, the same applies hereinafter) as a medium, 151 g of the urethane prepolymer 3 and 5 g of 1,4-butanediol were subjected to a crosslinking reaction with stirring for 3 hours at room temperature (23° C., the same applies hereinafter) in a nitrogen gas atmosphere to synthesize polymer particulates 1 dispersed in polyoxypropylene glycol. The index (molar ratio of NCO group/OH group) of the raw material was 0.52. The OH group in the index is the total of the OH groups of the medium and 1,4-butanediol (the same applies to the following synthesis of polymer particulates). A crosslinking point generated by the crosslinking reaction had a urethane bond.

The average particle size of the polymer particulates 1 was 10 μm, and the concentration of the polymer particulates 1 in the dispersion (the entirety of the polymer particulates 1 dispersed in the polyoxypropylene glycol) was 56 mass %. The glass transition temperature of the polymer particulates 1 was +40° C. The polymer particulates 1 theoretically have a hydroxyl group as an active hydrogen-containing group. The medium (polyoxypropylene glycol) in the dispersion was liquid under the condition of 23° C.

Synthesis of Polymer Particulates 2

In 183 g of polyoxypropylene glycol (Sannix GL-3000) as a medium, 119 g of the urethane prepolymer 4 and 3 g of 1,4-butanediol were subjected to a crosslinking reaction with stirring for 3 hours at room temperature in a nitrogen atmosphere to synthesize polymer particulates 2 dispersed in polyoxypropylene glycol. The index (molar ratio of NCO group/OH group) of the raw material was 0.32. A crosslinking point generated by the crosslinking reaction had a urethane bond.

The average particle size of the polymer particulates 2 was 2 μm, and the concentration of the polymer particulates 2 in the dispersion was 46 mass %. The glass transition temperature of the polymer particulates 2 was −30° C. The polymer particulates 2 theoretically have a hydroxyl group as an active hydrogen-containing group. The medium (polyoxypropylene glycol) in the dispersion was liquid under the condition of 23° C.

Synthesis of Polymer Particulates 3

In 260 g of polyoxypropylene glycol (Sannix GL-3000) as a medium, 125 g of the urethane prepolymer 5 and 5 g of 1,4-butanediol were subjected to a crosslinking reaction with stirring for 3 hours at room temperature in a nitrogen atmosphere to synthesize polymer particulates 3 dispersed in polyoxypropylene glycol. The index (molar ratio of NCO group/OH group) of the raw material was 0.34. A crosslinking point generated by the crosslinking reaction had a urethane bond.

The average particle size of the polymer particulates 3 was 5 μm, and the concentration of the polymer particulates 3 in the dispersion was 40 mass %. The glass transition temperature of the polymer particulates 3 was −20° C. The polymer particulates 3 theoretically have a hydroxyl group as an active hydrogen-containing group. The medium (polyoxypropylene glycol) in the dispersion was liquid under the condition of 23° C.

Synthesis of Polymer Particulates 4

In 80 g of polyoxypropylene glycol (Sannix GL-3000) as a medium, 40 g of maleic anhydride-modified polybutadiene (POLYVEST OC800S, available from Evonik Co., Ltd.) and 2 g of an oxazolidine compound (a reaction product obtained by reacting 3-(2-hydroxyethyl)-2-(1-methylbutyl)oxazolidine) (5BO, available from Toyo Gosei Co., Ltd.) and xylylene diisocyanate (XDI) at a molar ratio of 2:1. The oxazolidine ring is hydrolyzed by moisture in the air and produces a diamine having two amino groups ($-NH_2$) derived from the hydrolysis. The same applies hereinafter) were subjected to a crosslinking reaction with stirring for 3 hours at room temperature in the atmosphere to synthesize polymer particulates 4 dispersed in polyoxypropylene glycol. The molar ratio of maleic anhydride group/$NH_2$ group in the raw material was 1.0. The crosslinking point generated by the crosslinking reaction had an amide bond.

The average particle size of the polymer particulates 4 was 10 μm, and the concentration of the polymer particulates 4 in the dispersion was 34 mass %. The glass transition temperature of the polymer particulates 4 was −30° C. The medium (polyoxypropylene glycol) in the dispersion was liquid under the condition of 23° C.

[Chemical Formula 3]

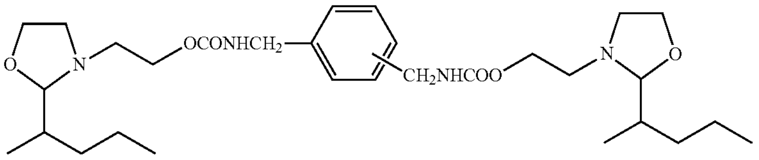

(IV)

Synthesis of Polymer Particulates 5

In 600 g of polyoxypropylene glycol (Sannix GL-3000) as a medium, 250 g of the urethane prepolymer 2 and 80 g of DETDA (diethylmethylbenzenediamine) were subjected to a crosslinking reaction with stirring for 3 hours at room temperature in a nitrogen atmosphere to synthesize polymer particulates 5 dispersed in polyoxypropylene glycol. The index of the raw material [molar ratio of NCO group/(OH+$NH_2$ group)] was 0.65. A crosslinking point generated by the crosslinking reaction had a urethane bond.

The average particle size of the polymer particulates 5 was 3 μm, the concentration of the polymer particulates 5 in the dispersion was 40 mass %, and the glass transition temperature was −20° C. The polymer particulates 5 theoretically have an amino group as an active hydrogen-containing group.

In the polymer particles, the amino group as an active hydrogen-containing group refers to a group in which a hydrogen atom is bonded to a nitrogen atom. However, the amino group does not include a urethane bond, a urea bond, or an amide bond (the same applies hereinafter).

The medium (polyoxypropylene glycol) in the dispersion was liquid under the condition of 23° C.

Synthesis of Polymer Particulates 6

In 150 g of polytetramethylene ether glycol (PTMG 1000) as a medium, 120 g of the urethane prepolymer 2 and 9 g of DETDA (diethylmethylbenzenediamine) were subjected to a crosslinking reaction with stirring for 3 hours at room temperature in a nitrogen atmosphere (the index of the raw material [molar ratio of NCO group/(OH+$NH_2$ group)] was 0.2). In the reaction between the urethane prepolymer 2 and DETDA, the polytetramethylene ether glycol can function as a medium. To the mixture of the reaction product of the urethane prepolymer 2 and DETDA and the polytetramethylene ether glycol obtained after the reaction, 150 g of 4,4'-diphenylmethane diisocyanate was further added, and the mixture was reacted with stirring for 4 hours at 80° C. in a nitrogen atmosphere to synthesize polymer particulates 6 dispersed in the urethane prepolymer.

The polymer particulates 6 mainly contain, as polymer particulates, a reaction product of the urethane prepolymer 2 and the DETDA. The crosslinking point generated by the reaction (crosslinking reaction) in the polymer particulates 6 had a urea bond and/or a urethane bond.

The polymer particulates 6 are finally dispersed in the urethane prepolymer, and the urethane prepolymer as the final medium mainly contains a urethane prepolymer obtained by reacting the polytetramethylene ether glycol used in the crosslinking reaction with 150 g of the 4,4'-diphenylmethane diisocyanate added after the crosslinking reaction. The final medium (urethane prepolymer) in the dispersion was liquid at 23° C.

The average particle size of the polymer particulates 6 was 8 μm, and the concentration of the polymer particulates 6 in the dispersion was 28 mass %. The glass transition temperature of the polymer particulates 6 was −20° C. The polymer particulates 6 theoretically have an isocyanate group.

Synthesis of Polymer Particulates 7

In 292 g of polyoxypropylene glycol (Sannix GL-3000) as a medium, 100 g of maleic anhydride-modified polybutadiene (Ricon 130 MA20, Mn 3600) and 46 g of the oxazolidine compound were reacted with stirring for 3 hours at room temperature in the atmosphere to synthesize polymer particulates 7 dispersed in polyoxypropylene glycol. The molar ratio of maleic anhydride group/$NH_2$ group of the raw material was 1.1. The crosslinking point generated by the crosslinking reaction had an amide bond.

The average particle size of the polymer particulates 7 was 10 μm, and the concentration of the polymer particulates 7 in the dispersion was 33 mass %. The glass transition temperature of the polymer particulates 7 was +10° C. The medium (polyoxypropylene glycol) in the dispersion was liquid under the condition of 23° C.

Production of Composition

The components in the column of base (A) of Examples in the following Tables 1 and 2 (hereinafter, each table) were used in the compositions (parts by mass) listed in the same tables, and were mixed with a stirrer under a nitrogen stream to prepare the base (A). The curing agent (B) of each example was prepared in the same manner.

In the preparation of the base and the curing agent, the polymer particulates 1 to 7 were each used in a state of a mixture with a medium.

In each table shown below, the net amount (amount excluding the medium) of each polymer particulates is listed in the columns of polymer particulates 1 to 7. The content of the polymer particulates (X) in the total amount of the composition does not include the content of the medium that may be used in the production of the polymer particulates (X).

"100 parts by mass" shown in the column of "Urethane prepolymer 1" of the base of Example 7 indicates that the urethane prepolymer as a medium in which the polymer particulates 6 (39 parts by mass) are dispersed after the production of the polymer particulates 6 is 100 parts by mass. No urethane prepolymer was added later to the base of Example 7. The same applies to the column of "Urethane prepolymer 1" of Example 9.

"60 parts by mass" shown in the column of "Polyol 1" of the curing agent (B) of Examples 1 to 6, 8, and 9 refers to the total amount of the medium accompanied by the polymer particulates (X) used for the curing agent (B) in each Example and the polyol 1 further added later thereto. The amount of the polyol 1 added later in the curing agent (B) is as follows.

Amount of polyol 1 added later in curing agent (B)

Example 1: 13 parts by mass
Example 2: 1 part by mass
Example 3: 0 parts by mass
Example 4: 2 parts by mass
Example 5: 0 parts by mass
Example 6: 0 parts by mass
Example 8: 13 parts by mass
Example 9: 36 parts by mass The base (A) and the curing agent (B) of each Example prepared as described above were mixed with a stirrer to produce a composition.

Equivalent Ratio*[1] of Isocyanate Group/Active Hydrogen-Containing Group

The equivalent ratio of all isocyanate groups to all active hydrogen-containing groups (molar ratio of all isocyanate groups/all active hydrogen-containing groups) in the total amount of the mixture of the base (A) and the curing agent (B) (composition of the present invention) is listed in the column "Equivalent ratio*[1] of isocyanate group/active hydrogen-containing group" in each table.

The amino group (group in which a hydrogen atom is bonded to a nitrogen atom) included as the active hydrogen-containing group in each polymer particulate does not include a urethane bond, a urea bond, or an amide bond (the same applies hereinafter).

Since the molar ratio of maleic anhydride group/$NH_2$ group was 1.0 for the polymer particulates 4 and 1.1 for the polymer particulates 7 as described above, the polymer particulates 4 and 7 may theoretically have an amino group derived from hydrolysis of a carboxylic anhydride and/or an oxazolidine ring as an active hydrogen-containing group, but the carboxylic anhydride and the amino group that the polymer particulates 4 and 7 may have are not added to the "active hydrogen-containing group" in "Equivalent ratio*[1] of isocyanate group/active hydrogen-containing group". The same applies to "amino group" in the "Equivalent ratio*[2] of isocyanate group/amino group" and the "Equivalent ratio*[3] of amino group/hydroxyl group" described later.

Equivalent Ratio*[2] of Isocyanate Group/Amino Group

The equivalent ratio of all isocyanate groups to all amino groups (molar ratio of all isocyanate groups/all amino groups) in the total amount of the mixture of the base (A) and the curing agent (B) (composition of the present invention) is listed in the column "Equivalent ratio*[2] of isocyanate group/amino group" in each table. The total amino groups described above include, for example, amino groups of polyamines in each table.

Equivalent Ratio*[3] of Amino Group/Hydroxyl Group

The equivalent ratio of all amino groups to all hydroxyl groups (molar ratio of all amino groups/all hydroxyl groups) in the total amount of the mixture of the base (A) and the curing agent (B) (composition of the present invention) is listed in the column "Equivalent ratio*[3] of amino group/hydroxyl group" in each table. The total amino groups described above include, for example, amino groups of polyamines in each table.

Evaluation

The following evaluations were performed by using the composition produced as described above. The results are shown in each Table.

Sample Preparation

Cured Product (P)

As described above, each composition was left under the conditions of 23° C. and 55% RH (relative humidity) for 7 days and cured, whereby a cured product (P) of the two-pack type curable adhesive composition (whole) was obtained.

Using each of the cured products (P) obtained as described above, tan δ, fatigue durability, and elongation at break described below were evaluated.

Cured Products (M) and (N)

The components in the column of the base (A) of Examples in each table were used in the makeup (parts by mass) listed in the same table, and were mixed with a stirrer under a nitrogen stream to prepare the base (A). The curing agent (B) of each example was prepared in the same manner. However, in the preparation of the base, polymer particulates and a medium accompanied by the particulates were not used. The same applies to the curing agent (B).

Each of the two-pack type curable adhesive compositions was mixed to prepare a remainder excluding the polymer particulates (X) and the accompanying medium, and the remainder was cured under the conditions of 23° C. and 55% RH (relative humidity) for 7 days to obtain a cured product (M) or (N) of the remainder.

Polymer Particulates (X): Cured Product (H)

In each synthesis of the polymer particulates 1 to 7 described above, a medium is not used, and the remaining components were left under the conditions of 23° C. and 55% RH (relative humidity) for 7 days, and a cured product (H) obtained by curing the components was handled as the polymer particulates (X).

Tan δ

Each of the cured products (P), (M), (N), and (H) obtained as described above was subjected to dynamic viscoelasticity measurement (dynamic mechanical analysis) under the conditions of a strain of 0.01%, a frequency of 100 Hz, and a heating rate of 5° C./min, and forced extension excitation was performed in a temperature region of from −40° C. to +80° C. to measure tan δ.

The minimum and maximum values of tan δ of the cured product (P) at −40° C., +20° C., and 80° C. and tan δ in the temperature region from −40° C. to +80° C. are shown in each table.

Evaluation Criteria of Damping Performance in Present Invention

In the present invention (the entire present invention including Methods 1 and 2), the damping performance was evaluated based on whether the tan δ of the cured product (P) in the temperature region of from −40° C. to +80° C. was 0.15 or greater. That is, in the present invention, when the tan δ was 0.15 or greater in the entire region of from −40° C. to +80° C., the damping performance was evaluated to be excellent.

As the minimum value of tan δ was larger than 0.15, the damping performance was evaluated to be more excellent.

On the other hand, when the tan δ of the cured product (P) in the temperature region of from −40° C. to +80° C. was less than 0.15 in at least a part of the temperature region, the damping performance was evaluated as poor.

The minimum values and the maximum values of tan δ in the temperature region of from −40° C. to +80° C. of the cured products (M), (N) and (H) are shown in each table.

Fatigue Durability

Using each composition obtained as described above, a sample for fatigue durability evaluation was produced under the following conditions, and a tensile shear fatigue property test in accordance with JIS K6864 was performed under the condition of a stress amplitude of 2.8 MPa.

Type of adherend: Electrodeposited steel sheet

Surface treatment method: The surface was wiped and washed with a solvent.

Composition coating method and curing conditions: Each composition obtained as described above was applied on an adherend with a cartridge gun. The composition was cured at 23° C. and 55% RH for 7 days.

Average thickness of adhesive layer: 30 μm

Evaluation Criteria of Fatigue Durability in Present Invention

When the sample did not break at a stress amplitude of 3.6 MPa with a repetition number of at least up to $10^7$ times, the sample was evaluated as having a best fatigue durability and indicated as "AAA".

When the sample did not break at a stress amplitude of 3.2 MPa with a repetition number of at least up to $10^7$ times but was broken at a stress amplitude of 3.6 MPa with the number of repetitions of up to $10^7$ times, the sample was evaluated as having very excellent fatigue durability and indicated as "AA".

When the sample did not break at a stress amplitude of 2.8 MPa with a repetition number of at least up to $10^7$ times but broke at a stress amplitude of 3.2 MPa with the number of repetitions of up to $10^7$ times, the sample was evaluated as having excellent fatigue durability and indicated as "A".

In the present invention (the entire present invention including Methods 1 and 2), when the evaluation is A or higher, the fatigue durability is considered to be excellent.

On the other hand, when the sample was broken at a stress amplitude of 2.8 MPa with a repetition number of at least up to $10^7$ times, the sample was evaluated as having poor fatigue durability and indicated as "B".

Elongation at Break, Tensile Modulus of Elasticity

A dumbbell-shaped No. 3 test piece (2 mm thick) was produced by using each cured product obtained as described above.

The cured product (P) was subjected to a tensile test in accordance with JIS K6251 using the test piece, and the elongation at break (fracture elongation) was measured under the conditions of a temperature of 20° C. and a crosshead speed (tensile speed) of 200 mm/min with gauge marks for measuring the elongation at break attached at intervals of 20 mm.

For the cured products (M), (N), and (H), the tensile modulus of elasticity was measured from all points between the strains of from 0.1 to 1% using the least squares method.

Evaluation Reference

Elongation at Break of Cured Product (P)

The elongation at break of the cured product (P) is preferably 50% or greater, and more preferably from 100 to 1000% from the viewpoint of obtaining more excellent fatigue durability.

Evaluation Criteria in the Case of Method 1

Aspects of Method 1 were also evaluated according to the following criteria.

Tensile Modulus of Elasticity of Cured Product (M) and Maximum Value and Minimum Value of Tan δ of Cured Product (H)

For the cured product (P) obtained by Method 1, it was evaluated that the fatigue durability and the damping performance were more excellent, and the fatigue durability and the damping performance were able to be balanced at a higher level when the tensile modulus of elasticity of the cured product (M) obtained by curing the matrix obtained by removing the polymer particulates (X) from the two-pack type curable adhesive composition (or the remainder obtained by removing the polymer (X) and the medium from the two-pack type curable adhesive composition) was 5 MPa or more, and the minimum value of the loss tangent of the polymer particulates (X) (that is, the cured product (H)) was 0.05 or greater under the specific conditions described above.

As the tensile modulus of elasticity of the cured product (M) becomes larger than 5 MPa, the fatigue durability becomes more excellent.

As the minimum value of the loss tangent of the polymer particulates (X) becomes larger than 0.05, the damping performance becomes more excellent.

Evaluation Criteria in the Case of Method 2

Aspects of Method 2 were also evaluated according to the following criteria.

Minimum Value of Tan δ of Cured Product (N) and Tensile Modulus of Elasticity of Cured Product (H)

For the cured product (P) obtained by Method 2, it was evaluated that the fatigue durability and the damping performance were more excellent, and the fatigue durability and the damping performance were able to be balanced at a higher level when the maximum value of the loss tangent of the cured product (N) obtained by curing the matrix obtained by removing the polymer particulates (X) from the two-pack type curable adhesive composition (or the remainder obtained by removing the polymer (X) and the medium from the two-pack type curable adhesive composition) was 0.3 or greater under the specific conditions as described above, and the tensile modulus of elasticity of the polymer particulates (X) (that is, the cured product (H)) was 5 MPa or more under the specific conditions described above.

As the maximum value of the loss tangent of the cured product (N) becomes larger than 0.3, the damping performance becomes more excellent.

As the tensile modulus of elasticity of the cured product (P) becomes larger than 5 MPa, the fatigue durability becomes more excellent.

TABLE 1-1

| | Table 1 | Example 1 | Example 2 | Example 3 | Example 4 |
|---|---|---|---|---|---|
| Base (A) | Urethane prepolymer 1 | 100 | 100 | 100 | 100 |
| | Urethane prepolymer 2 | | | | |
| | Urethane prepolymer 4 | | | | |
| | Polymer particulates 6 Tg: −20° C. | | | | |
| | Carbon black | 7.5 | 7.5 | 7.5 | 7.5 |
| | Calcium carbonate 1 | 15 | 15 | 15 | 15 |
| | Plasticizer | 5 | 5 | 5 | 5 |
| | Total base (A) | 127.5 | 127.5 | 127.5 | 127.5 |
| Curing agent (B) | Polyol 1 | 60 | 60 | 60 | 60 |
| | Polymer particulates 1 Tg: +40° C. | 60 | | | |
| | Polymer particulates 2 Tg: −30° C. | | 50 | | |
| | Polymer particulates 3 Tg: −20° C. | | | 40 | |
| | Polymer particulates 4 Tg: −30° C. | | | | 30 |
| | Polymer particulates 5 Tg: −20° C. | | | | |
| | Polymer particulates 7 Tg: +10° C. | | | | |
| | Comparative polymer particulates 1 (polymethacrylic acid particle) Tg: +100° C. | | | | |
| | Polyamine | 15 | 15 | 15 | 15 |
| | Calcium carbonate 2 | 42.5 | 42.5 | 42.5 | 42.5 |
| | Silica | 10 | 10 | 10 | 10 |
| | Total curing agent (B) | 187.5 | 177.5 | 167.5 | 157.5 |
| Index in producing urethane prepolymers 1, 2, 4 | | 4.00 | 4.00 | 4.00 | 4.00 |
| Composition | Equivalent ratio*1 of isocyanate group/active hydrogen-containing group | 1.34 | 1.34 | 1.34 | 1.34 |
| | Equivalent ratio*2 of isocyanate group/amino group | 1.78 | 1.78 | 1.78 | 1.78 |
| | Equivalent ratio*3 of amino group/hydroxyl group | 2.99 | 2.99 | 2.99 | 2.99 |
| Polymer particulates | Isocyanate group/active hydrogen group in producing polymer particulates)*4 | 0.52 | 0.32 | 0.34 | |
| | Maleic anhydride group/amino group in producing polymer particulates | | | | 1 |
| | Content (mass %) of polymer particulates in total amount of composition | 19.05 | 16.39 | 13.56 | 10.53 |

TABLE 1-2

| | Table 1 | Example 5 | Example 6 | Example 7 | Example 8 |
|---|---|---|---|---|---|
| Base (A) | Urethane prepolymer 1 | | | 100 | |
| | Urethane prepolymer 2 | | | | 100 |
| | Urethane prepolymer 4 | 100 | 100 | | |
| | Polymer particulates 6 Tg: −20° C. | | | 39 | |
| | Carbon black | 7.5 | 7.5 | 7.5 | 7.5 |
| | Calcium carbonate 1 | 15 | 15 | 15 | 15 |
| | Plasticizer | 5 | 5 | 5 | 5 |
| | Total base (A) | 127.5 | 127.5 | 166.5 | 127.5 |
| Curing agent (B) | Polyol 1 | 60 | 60 | 60 | 60 |
| | Polymer particulates 1 Tg: +40° C. | | | | 60 |
| | Polymer particulates 2 Tg: −30° C. | | | | |
| | Polymer particulates 3 Tg: −20° C. | | | | |
| | Polymer particulates 4 Tg: −30° C. | | | | |
| | Polymer particulates 5 Tg: −20° C. | 40 | | | |
| | Polymer particulates 7 Tg: +10° C. | | 30 | | |
| | Comparative polymer particulates 1 (polymethacrylic acid particle) Tg: +100° C. | | | | |
| | Polyamine | 1 | 1 | 15 | 15 |
| | Calcium carbonate 2 | 56.5 | 56.5 | 42.5 | 42.5 |
| | Silica | 10 | 10 | 10 | 10 |
| | Total curing agent (B) | 167.5 | 157.5 | 127.5 | 187.5 |

TABLE 1-2-continued

| Table 1 | | Example 5 | Example 6 | Example 7 | Example 8 |
|---|---|---|---|---|---|
| Index in producing urethane prepolymers 1, 2, 4 | | 2.50 | 2.50 | 4.00 | 6.00 |
| Composition | Equivalent ratio*[1] of isocyanate group/active hydrogen-containing group | 1.00 | 1.00 | 1.34 | 2.23 |
| | Equivalent ratio*[2] of isocyanate group/amino group | 6.02 | 6.02 | 1.78 | 2.97 |
| | Equivalent ratio*[3] of amino group/hydroxyl group | 0.20 | 0.20 | 2.99 | 2.99 |
| Polymer particulates | Isocyanate group/active hydrogen group in producing polymer particulates)*[4] | 0.65 | | 0.2 | 0.52 |
| | Maleic anhydride group/amino group in producing polymer particulates | | 1.1 | | |
| | Content (mass %) of polymer particulates in total amount of composition | 13.56 | 10.53 | 13.27 | 19.05 |

TABLE 2

| | Table 1-continued | Example 1 | Example 2 | Example 3 | Example 4 | Example 5 | Example 6 | Example 7 | Example 8 |
|---|---|---|---|---|---|---|---|---|---|
| Tensile modulus of elasticity tan δ of cured products (M), (N), and (H) | Tensile modulus of elasticity (MPa) of cured products (M) and (N) containing no polymer particulates or medium. | 150 | 150 | 150 | 150 | 2 | 2 | 150 | 200 |
| | Minimum value of tan δ of cured product (H) of polymer particulates and temperature at that time (100 Hz. −40 to +80° C.) | 0.19 −40° C. | 0.21 80° C. | 0.25 80° C. | 0.24 80° C. | 0.11 80° C. | 0.18 80° C. | 0.22 80° C. | 0.19 −40° C. |
| | Maximum value of tan δ of cured product (H) of polymer particulates and temperature at that time (100 Hz) | 0.82 +40° C. | 1.08 −30° C. | 0.97 −20° C. | 1.03 −30° C. | 0.13 −20° C. | 0.31 +10° C. | 0.88 −2° C. | 0.52 +40° C. |
| | Tensile modulus of elasticity (MPa) of cured product (H) of polymer particulates | 30 | 3 | 2 | 2 | 200 | 80 | 5 | 30 |
| | Minimum value of tan δ of cured products (M) and (N) containing no polymer particulates or medium and temperature at that time (100 Hz. −40 to +80° C.) | 0.10 80° C. | 0.10 80° C. | 0.10 80° C. | 0.10 80° C. | 0.22 80° C. | 0.22 80° C. | 0.10 80° C. | 0.10 80° C. |
| | Maximum value of tan δ of cured products (M) and (N) containing no polymer particulates or medium and temperature at that time (100 Hz) | 0.13 +20° C. | 0.13 +20° C. | 0.13 +20° C. | 0.13 +20° C. | 0.77 −40° C. | 0.77 −40° C. | 0.13 +20° C. | 0.13 +20° C. |
| Cured product (P) of com-position | tan δ (−40° C.) | 0.16 | 0.43 | 0.36 | 0.42 | 0.53 | 0.57 | 0.32 | 0.16 |
| | tan δ (+20° C.) | 0.40 | 0.31 | 0.33 | 0.29 | 0.21 | 0.25 | 0.26 | 0.33 |
| | tan δ (+80° C.) | 0.24 | 0.16 | 0.18 | 0.17 | 0.20 | 0.20 | 0.22 | 0.22 |
| | Minimum value of tan δ and temperature in temperature region of from −40 to +80° C. | 0.16 −40° C. | 0.16 +80° C. | 0.18 +80° C. | 0.17 +80° C. | 0.20 +80° C. | 0.20 +80° C. | 0.22 +80° C. | 0.16 −40° C. |
| | Maximum value of tan δ and temperature in temperature region of from −40 to +80° C. | 0.40 +20° C. | 0.43 −40° C. | 0.36 −40° C. | 0.42 −40° C. | 0.53 −40° C. | 0.57 −40° C. | 0.32 −40° C. | 0.33 +20° C. |
| | Fatigue durability*[5] (tensile shear fatigue property test) | AAA | AA | AA | AAA | A | A | AAA | AAA |
| | Elongation at break (%) | 300 | 350 | 330 | 320 | 600 | 620 | 310 | 280 |
| | Method 1 or Method 2* | Method 1 | Method 1 | Method 1 | Method 1 | Method 2 | Method 2 | Method 1 | Method 1 |

*In the case of Method 1, the cured product containing no polymer particulates or medium is the cured product (M).

*In the case of Method 2, the cured product containing no polymer particulates or medium is the cured product (N).

TABLE 3

| | Table 2 | Comparative Example 1 | Comparative Example 2 | Example 9 | Comparative Example 3 | Comparative Example 4 |
|---|---|---|---|---|---|---|
| Base (A) | Urethane prepolymer 1 | 100 | | 100 | 100 | |
| | Urethane prepolymer 2 | | | | | |
| | Urethane prepolymer 4 | | 100 | | | 100 |
| | Polymer particulates 6 Tg: −20° C. | | | 39 | | |
| | Carbon black | 7.5 | 7.5 | 7.5 | 7.5 | 7.5 |
| | Calcium carbonate 1 | 15 | 15 | 15 | 15 | 15 |
| | Plasticizer | 5 | 5 | 5 | 5 | 5 |
| | Total base (A) | 127.5 | 127.5 | 166.5 | 127.5 | 127.5 |
| Curing agent (B) | Polyol 1 | 60 | 60 | 60 | 60 | 60 |
| | Polymer particulates 1 Tg: +40° C. | | | 30 | | |
| | Polymer particulates 2 Tg: −30° C. | | | | | |
| | Polymer particulates 3 Tg: −20° C. | | | | | |
| | Polymer particulates 4 Tg: −30° C. | | | | | |
| | Polymer particulates 5 Tg: −20° C. | | | | | |
| | Polymer particulates 7 Tg: +10° C. | | | | | |
| | Comparative polymer particulates 1 (polymethacrylic acid particle) Tg: +100° C. | | | | 30 | 30 |
| | Polyamine | 15 | 1 | 15 | 15 | 1 |
| | Calcium carbonate 2 | 42.5 | 56.5 | 42.5 | 42.5 | 56.5 |
| | Silica | 10 | 10 | 10 | 10 | 10 |
| | Total curing agent (B) | 127.5 | 127.5 | 157.5 | 157.5 | 157.5 |
| Index in producing urethane prepolymers 1, 2, 4 | | 4.00 | 2.50 | 4.00 | 4.00 | 2.50 |
| Composition | Equivalent ratio*[1] of isocyanate group/active hydrogen-containing group | 1.34 | 1.00 | 1.34 | 1.34 | 1.00 |
| | Equivalent ratio*[2] of isocyanate group/amino group | 1.78 | 6.02 | 1.78 | 1.78 | 6.02 |
| | Equivalent ratio*[3] of amino group/hydroxyl group | 2.99 | 0.20 | 2.99 | 2.99 | 0.20 |
| Polymer particulates | Isocyanate group/active hydrogen group in producing polymer particulates)*[4] | — | — | 0.2 | — | — |
| | Maleic anhydride group/amino group in producing polymer particulates | — | — | 1 | — | — |
| | Content (mass %) of polymer particulates in total amount of composition | 0.00 | 0.00 | 21.30 | 10.53 | 10.53 |

TABLE 4

| | Table 2-continued | Comparative Example 1 | Comparative Example 2 | Example 9 | Comparative Example 3 | Comparative Example 4 |
|---|---|---|---|---|---|---|
| Tensile modulus of elasticity tan δ of cured products (M), (N), and (H) | Tensile modulus of elasticity (MPa) of cured products (M) and (N) containing no polymer particulates or medium. | 150 | 2 | 150 | 150 | 2 |
| | Minimum value of tan δ of cured product (H) of polymer particulates and temperature at that time (100 Hz. −40 to +80° C.) | — | — | 0.19, −40° C. (polymer particulates 1)/ 0.22, 80° C. (polymer particulates 6) | No data | No data |
| | Maximum value of tan δ of cured product (H) of polymer particulates and temperature at that time (100 Hz) | — | — | 0.82, +40° C. (polymer particulates 1)/ 0.88, −20° C. (polymer particulates 6) | (Only temperature of maximum value of tan δ is indicated) +100° C. | (Only temperature of maximum value of tan δ is indicated) +100° C. |
| | Tensile modulus of elasticity (MPa) of cured product (H) of polymer particulates | — | — | 30 (polymer particulates 1)/ 5 (polymer particulates 6) | No data | No data |
| | Minimum value of tan δ of cured products (M) and (N) containing no polymer particulates or medium and temperature at that time (100 Hz. −40 to +80° C.) | 0.10 80° C. | 0.22 80° C. | 0.10 80° C. | 0.10 80° C. | 0.22 80° C. |

TABLE 4-continued

| | Table 2-continued | Comparative Example 1 | Comparative Example 2 | Example 9 | Comparative Example 3 | Comparative Example 4 |
|---|---|---|---|---|---|---|
| | Maximum value of tan δ of cured products (M) and (N) containing no polymer particulates or medium and temperature at that time (100 Hz) | 0.13<br>+20° C. | 0.77<br>−40° C. | 0.13<br>+20° C. | 0.13<br>+20° C. | 0.77<br>−40° C. |
| Cured product (P) of composition | tan δ (−40° C.) | 0.13 | 0.77 | 0.29 | 0.08 | 0.50 |
| | tan δ (+20° C.) | 0.18 | 0.35 | 0.33 | 0.13 | 0.18 |
| | tan δ (+80° C.) | 0.10 | 0.22 | 0.22 | 0.22 | 0.25 |
| | Minimum value of tan δ and temperature in temperature region of from −40 to +80° C. | 0.10<br>+80° C. | 0.22<br>+80° C. | 0.22<br>+80° C. | 0.08<br>−40° C. | 0.18<br>+20° C. |
| | Maximum value of tan δ and temperature in temperature region of from −40 to +80° C. | 0.18<br>+20° C. | 0.77<br>−40° C. | 0.33<br>+20° C. | 0.22<br>+80° C. | 0.50<br>−40° C. |
| | Fatigue durability*[5] (tensile shear fatigue property test) | A | B | AAA | A | B |
| | Elongation at break (%) | 310 | 650 | 310 | 190 | 280 |
| | Method 1 or Method 2* | Method 1 (comparison) | Method 2 (comparison) | Method 1 | Method 1 | Method 2 |

*In the case of Method 1, the cured product containing no polymer particulates or medium is the cured product (M).

*In the case of Method 2, the cured product containing no polymer particulates or medium is the cured product (N).

The details of each component shown in each table are as follows. Base (A)

Urethane Prepolymer

Urethane prepolymers 1, 2, 4: urethane prepolymers 1, 2, 4 produced as described above Polymer Particulates (X)

Polymer particulates 6: polymer particulates 6 produced as described above

Carbon black: 200 MP, available from NSCC Carbon Co., Ltd.

Calcium carbonate 1: heavy calcium carbonate, Super S, available from Maruo Calcium Co., Ltd.

Plasticizer: diisononyl phthalate, available from Jay Plus, Inc.

Curing Agent (B)

Active Hydrogen Group-Containing Compound

Polyol 1: polypropylene glycol, SANNIX GL-3000, available from Sanyo Chemical Industries, Ltd. OH3 functional When polymer particulates (X) with a polyol as a medium were added to the curing agent (B), the polyol as a medium was added to the polyol 1.

Polymer Particulates (X)

Polymer particulates 1 to 5 and 7: polymer particulates 1 to 5 and 7 produced as described above Comparative polymer particulates 1: A mixture of comparative polymer particulates 1 and polyoxypropylene glycol as a medium was prepared as follows.

15 parts by mass of polymethacrylic acid particulates (product number XX-2851Z, available from Sekisui Plastics Co., Ltd., concentration of particulates of 100 mass %, average particle size of particulates of 0.3 μm, glass transition temperature of fine particle of 100° C.) as the comparative polymer particulates 1 and 100 parts by mass of polyoxypropylene glycol (Sannix GL-3000) as a medium were mixed and homogenized using a paint mill (S-43/4X11, INOUE MFG., INC.). The particulates of polymethacrylic acid do not have an active hydrogen-containing group.

Polyamine: diethylmethylbenzenediamine, DETDA, available from Mitsui Fine Chemicals, Inc.

Calcium carbonate 2: light calcium carbonate, KALFAIN 200, available from Maruo Calcium Co., Ltd.

Silica: Reolosil QS-102S, available from Tokuyama Corporation

As is clear from the results shown in the tables, the compositions of the present invention were able to provide high fatigue durability and high damping performance in a compatible manner.

On the other hand, in Comparative Example 1 in which the polymer particulates (X) for improving the damping performance were not contained in Method 1, although the fatigue durability of the cured product obtained by curing the entire composition was excellent, the minimum value of the loss tangent of the cured product was less than 0.15 in a part of the temperature region of from −40° C. to +80° C., and the damping performance was poor.

In Comparative Example 3 in which the polymer particulates (X) were not contained and instead polymer particulates having a Tg of more than 80° C. were contained, although the fatigue durability of the cured product obtained by curing the entire composition was excellent, the minimum value of the loss tangent of the cured product was less than 0.15 in a part of the temperature region of from −40° C. to +80° C., and the damping performance was poor.

In Comparative Example 2 in which the polymer particulates (X) for improving fatigue durability were not contained in Method 2, although the damping performance of the cured product obtained by curing the entire composition was excellent, the fatigue durability of the cured product was poor.

In Comparative Example 4 in which the polymer particulates (X) were not contained and instead polymer particulates having a Tg of more than 80° C. were contained, the fatigue durability of the obtained cured product was poor.

REFERENCE SIGNS LIST

10 Cured product (P)
12 Cured product of matrix
14 Polymer particulates (X)

The invention claimed is:

1. A two-pack type curable adhesive composition comprising:
- a base (A) containing a urethane prepolymer (al) having an isocyanate group; and
- a curing agent (B),
- at least one of the base (A) or the curing agent (B) containing polymer particulates (X) having an average particle size of from 0.01 to 200 μm,
- the polymer particulates (X) having a glass transition temperature of from −40° C. to +80° C.,
- a content of the polymer particulates (X) being 5 mass % or greater in a total amount of the two-pack type curable adhesive composition,
- a cured product (P) obtained by curing the two-pack type curable adhesive composition having a loss tangent of 0.15 or greater under conditions of a temperature region of from −40° C. to +80° C. and a frequency of 100 Hz, and
- the cured product (P) not breaking under conditions of a stress amplitude of 2.8 MPa and a repetition number of up to $10^7$ times in a tensile shear fatigue property test in accordance with JIS K6864.

2. The two-pack type curable adhesive composition according to claim 1, wherein the cured product (P) has an elongation at break of 50% or greater.

3. The two-pack type curable adhesive composition according to claim 1, wherein the curing agent (B) contains a polyol compound (b1) and/or a polyamine compound (b2).

4. The two-pack type curable adhesive composition according to claim 3, wherein the polyol compound (b1) contains at least one selected from the group consisting of a polyoxyethylene polyol, a polyoxypropylene polyol, a polyoxyethylene polyoxypropylene polyol, a polybutadiene polyol, a polyisoprene polyol, a polyacrylic polyol, and partially modified products obtained by partially modifying each of them.

5. The two-pack type curable adhesive composition according to claim 1, wherein the polymer particulates (X) contain a polymer obtained by reacting a polyisocyanate compound (x1) with at least one compound (x2) selected from the group consisting of a polyol compound, a polyamine compound, and a latent polyamine compound.

6. The two-pack type curable adhesive composition according to claim 1, wherein the polymer particulates (X) contain a polymer obtained by reacting a maleic anhydride-modified oligomer (x3) with at least one compound (x4) selected from the group consisting of a polyol compound, a polyamine compound, and a latent polyamine compound.

7. The two-pack type curable adhesive composition according to claim 1, wherein
- a cured product (M) obtained by curing a remainder obtained by removing the polymer particulates (X) from the two-pack type curable adhesive composition has a tensile modulus of elasticity of 5 MPa or more, and
- the polymer particulates (X) have a minimum value of a loss tangent of 0.05 or greater as measured under conditions of a temperature region of from −40° C. to +80° C. and a frequency of 100 Hz.

8. The two-pack type curable adhesive composition according to claim 1, wherein
- the urethane prepolymer (a1) is obtained by reacting a polyisocyanate compound (a2) and a polyol compound (a3) at an equivalent ratio of an isocyanate group in the polyisocyanate compound (a2) to a hydroxyl group in the polyol compound (a3) of from 1.5 to 14,
- the curing agent (B) contains a polyol compound (b1) and a polyamine compound (b2),
- an equivalent ratio of an isocyanate group in the base (A) to an active hydrogen-containing group in the curing agent (B) is from 0.8 to 4, and
- an equivalent ratio of an isocyanate group in the base (A) to an amino group in the polyamine compound (b2) is from 1.2 to 6.

9. The two-pack type curable adhesive composition according to claim 8, wherein the polyol compound (a3) contains at least one selected from the group consisting of a polyester polyol, polytetramethylene ether glycol, a polycarbonate polyol, a polycaprolactone polyol, and partially modified products obtained by partially modifying each of them.

10. The two-pack type curable adhesive composition according to claim 1, wherein
- a cured product (N) obtained by curing a remainder obtained by removing the polymer particulates (X) from the two-pack type curable adhesive composition has a minimum value of a loss tangent of 0.05 or greater as measured under conditions of a temperature region of from −40° C. to +80° C. and a frequency of 100 Hz, and
- the polymer particulates (X) have a tensile modulus of elasticity of 5 MPa or more.

11. The two-pack type curable adhesive composition according to claim 1, wherein
- the urethane prepolymer (a1) is obtained by reacting a polyisocyanate compound (a2) and a polyol compound (a3) at an equivalence ratio of an isocyanate group in the polyisocyanate compound (a2) to a hydroxyl group in the polyol compound (a3) of from 1.5 to 2.5,
- the curing agent (B) contains a polyol compound (b1) and a polyamine compound (b2),
- an equivalent ratio of an isocyanate group in the base (A) to an active hydrogen-containing group in the curing agent (B) is from 0.8 to 4, and
- an equivalent ratio of an isocyanate group in the base (A) to an amino group in the polyamine compound (b2) is from 1.5 to 8.0.

12. The two-pack type curable adhesive composition according to claim 11, wherein the polyol compound (a3) contains at least one selected from the group consisting of polyoxypropylene glycol, a polybutadiene polyol, a polyisoprene polyol, a polyacrylic polyol, and partially modified products obtained by partially modifying each of them.

13. The two-pack type curable adhesive composition according to claim 1, wherein a maximum value of the loss tangent of the cured product (P) measured under conditions of a temperature region of from −40° C. to +80° C. and a frequency of 100 Hz is 0.3 or greater.

14. The two-pack type curable adhesive composition according to claim 1, wherein the polymer particulates (X) are polymer particulates obtained by crosslinking a crosslinkable oligomer or a crosslinkable polymer in at least one medium selected from the group consisting of water, an organic solvent, an oligomer, and a polymer.

15. The two-pack type curable adhesive composition according to claim 7, wherein the urethane prepolymer (a1) is obtained by reacting a polyisocyanate compound (a2) and a polyol compound (a3) at an equivalent ratio of an isocyanate group in the polyisocyanate compound (a2) to a hydroxyl group in the polyol compound (a3) of from 1.5 to 14, the curing agent (B) contains a polyol compound (b1) and a polyamine compound (b2), an equivalent ratio of an isocyanate group in the base (A) to an active hydrogen-containing group in the curing agent (B) is from 0.8 to 4, and an equivalent ratio of an isocyanate group in the base (A) to an amino group in the polyamine compound (b2) is from 1.2 to 6.

16. The two-pack type curable adhesive composition according to claim 15, wherein the polyol compound (a3) contains at least one selected from the group consisting of a polyester polyol, polytetramethylene ether glycol, a polycarbonate polyol, a polycaprolactone polyol, and partially modified products obtained by partially modifying each of them.

17. A two-pack type curable adhesive composition comprising:

a base (A) containing a urethane prepolymer (al) having an isocyanate group; and a curing agent (B), at least one of the base (A) or the curing agent (B) containing polymer particulates (X) having an average particle size of from 0.01 to 200 μm, the polymer particulates (X) having a glass transition temperature of from −40° C. to +80° C., a content of the polymer particulates (X) being 5 mass % or greater in a total amount of the two-pack type curable adhesive composition, a cured product (P) obtained by curing the two-pack type curable adhesive composition having a loss tangent of 0.15 or greater under conditions of a temperature region of from −40° C. to +80° C. and a frequency of 100 Hz, and the cured product (P) not breaking under conditions of a stress amplitude of 2.8 MPa and a repetition number of up to $10^7$ times in a tensile shear fatigue property test in accordance with JIS K6864, wherein a cured product (N) obtained by curing a remainder obtained by removing the polymer particulates (X) from the two-pack type curable adhesive composition has a minimum value of a loss tangent of 0.05 or greater as measured under conditions of a temperature region of from-40° C. to +80° C. and a frequency of 100 Hz, the polymer particulates (X) have a tensile modulus of elasticity of 5 MPa or more, the urethane prepolymer (al) is obtained by reacting a polyisocyanate compound (a2) and a polyol compound (a3) at an equivalence ratio of an isocyanate group in the polyisocyanate compound (a2) to a hydroxyl group in the polyol compound (a3) of from 1.5 to 2.5, the curing agent (B) contains a polyol compound (b1) and a polyamine compound (b2), an equivalent ratio of an isocyanate group in the base (A) to an active hydrogen-containing group in the curing agent (B) is from 0.8 to 4, and an equivalent ratio of an isocyanate group in the base (A) to an amino group in the polyamine compound (b2) is from 1.5 to 8.0.

18. The two-pack type curable adhesive composition according to claim 17, wherein the polyol compound (a3) contains at least one selected from the group consisting of polyoxypropylene glycol, a polybutadiene polyol, a polyisoprene polyol, a polyacrylic polyol, and partially modified products obtained by partially modifying each of them.

* * * * *